United States Patent [19]

Anderson

[11] 4,162,690
[45] Jul. 31, 1979

[54] VALVE LOCKING DEVICE
[75] Inventor: Carl S. Anderson, Worcester, Mass.
[73] Assignee: Jamesbury Corp., Worcester, Mass.
[21] Appl. No.: 852,837
[22] Filed: Nov. 18, 1977
[51] Int. Cl.² ............................................ F16K 35/06
[52] U.S. Cl. ...................................... 137/385; 70/180
[58] Field of Search .......................... 70/177, 178, 180; 137/385

[56]  References Cited
U.S. PATENT DOCUMENTS

| 3,401,715 | 9/1968 | Johnson et al. | 137/385 |
| 3,960,168 | 6/1976 | Plympton | 137/385 |

OTHER PUBLICATIONS

Contromatics, "Ball Valve Padlocking Device," (Litton Publication).

*Primary Examiner*—Gerald A. Michalsky
*Attorney, Agent, or Firm*—Oblon, Fisher, Spivak, McClelland & Maier

[57] ABSTRACT

A locking device for a valve disposed in a housing including a stem assembly projecting from the valve for rotation of the valve between an open and closed position which includes a handle assembly provided with a handgrip portion at a first end thereof and a securing member at a second end thereof connected to the stem assembly. The locking device also provides for an abutment member mounted on the housing as well as a locking member mounted on the handle assembly so as to interfittingly cooperate with the handle assembly securing member and the abutment member to secure the valve in either the open or the closed valve position.

9 Claims, 5 Drawing Figures

VALVE LOCKING DEVICE

BACKGROUND OF THE INVENTION

1. Field of the Invention

This invention relates to a locking device for a valve characterized by a handle, shroud and valve housing which serve to secure the valve in either an open or closed position. Moreover, the handle, shroud and valve housing can also be utilized with a padlock to further secure the valve in either the open or closed position.

2. Description of the Prior Art

Rotatable valves, particularly ball valves, are frequently used in situations where rapid, efficient cut-off or flow diversion are required in hydraulic systems. Prior art valve locking devices which are attached to valves having a rotatable stem turned by a handle are generally of two fundamental types, one being of the type which completely encloses the valve handle so that the enclosure is lockable while the other type secures the handle to the valve body or some fixture attached to the valve body. In the latter type, the fixed portion of the device is provided with an aperture which is aligned with another aperture on a portion of the device which is mounted with the handle or is actually a part of the handle itself such that a padlock or other securing device can be inserted through the apertures. An example of this latter type of device is shown in U.S. Pat. No. 3,865,130 to Mullis. Still another type of valve locking device is known which provides a three part locking assembly including a handle, a securing member mounted to a valve housing and a movable locking member interconnecting the handle and the securing member as exemplified in U.S. Pat. No. 3,960,168 to Plympton.

SUMMARY OF THE INVENTION

An object of this invention is to provide a locking device which includes a handle assembly and locking member which cooperate with an abutment member mounted on a valve housing to secure a valve in either an open or closed position.

Still another object of this invention is to provide a valve locking device that functions cooperatively in a structure to enclose the juncture of a rotatable valve stem and valve handle to thereby prevent tampering with or removal of a member securing the handle to the valve stem.

Still another object of this invention is to provide a valve locking device which can be easily mounted on a valve to provide a device that can secure a valve in an open or closed position by a padlock or other locking and securing device.

A further object of the present invention is to provide a valve locking device which includes a handgrip attachable to a valve stem at either of two opposite positions oriented 180° from one another.

According to the present invention, the foregoing and other objects are attained by providing a locking device which includes a valve disposed in a housing as well as a stem assembly projecting from the valve for rotation of the valve between an open and closed position, a handle assembly provided with a handgrip portion at a first end thereof and a securing member at a second end thereof connected to the stem assembly, an abutment member mounted on the housing and a locking member mounted on the handle assembly so as to interfittingly cooperate with the handle assembly securing member and the abutment member to secure the valve in either the open or closed position.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
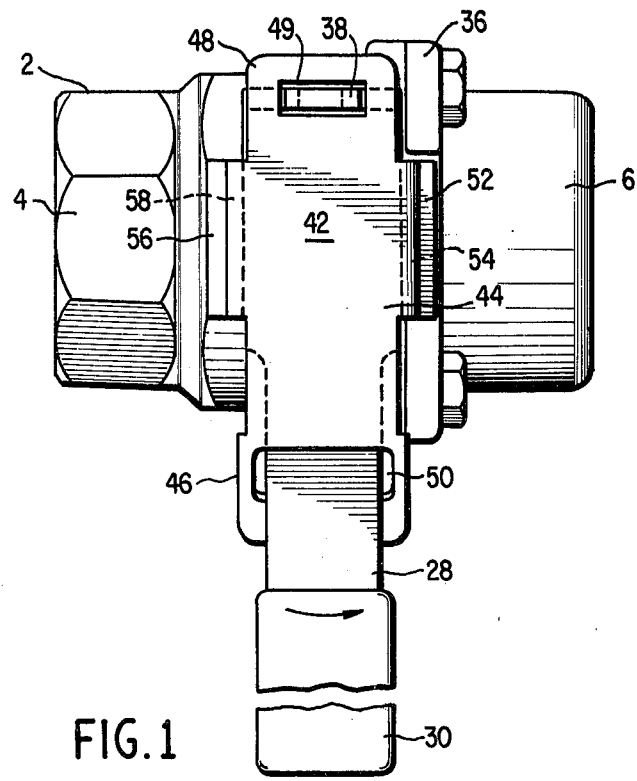
FIG. 1 is a plan view of the present invention in a valve-closed position.

The invention will be described in greater detail hereinafter with reference to FIGS. 1-4. Valve 1 includes a valve housing 2 formed by the interconnection of a first valve housing section 4 and second valve housing section 6. Fluidic flow through valve housing 2 is provided by port 8 in first valve housing section 4 and port 10 in a second valve housing section 6. Rotatable ball 12 with bore 14 is enclosed by valve housing 2 while a plurality of seat rings 13 provide a seal between rotatable ball 12 and valve housing 2.

In the preferred embodiment, first valve housing section 4 is connected to second valve housing section 6 by a plurality of connecting elements as exemplified by bolts 70 and nuts 68 although any conventional method of securing the housing sections together could be utilized. Valve housing 2 is also provided with a raised lug 36 which forms an abutment extending above second valve housing section 6.

Rotatable ball 12 also includes a socket 16 provided in the upper surface thereof which matingly engages plug 18 of rotatable stem 20. Rotatable stem 20 is, in turn, conventionally mounted in an aperture provided in first valve housing section 4 and extends upwardly to form shaft 22 which is provided with threaded portion 24 with which stem nut 25 and 26 are matingly engaged with handle assembly 28 disposed therebetween.

Locking device 27 includes handle assembly 28 which is formed by a handgrip portion 30 at one end, an intermediate handle portion 32 and an L-shaped extension member 34 provided at the second end thereof. L-shaped extension member 34 is also provided with leg 35 and a further extension in the form of securing lug 38 and lug aperture 40.

Locking device 27 also includes a movable locking shroud 42 which is mounted on handle assembly 28. Movable locking shroud 42 includes a shroud base 44 and a first and second flange, 46 and 48 respectively, which extend along the longitudinal axis of shroud base 44. First flange 46 is downwardly angled and is provided with an aperture 50 within which intermediate handle portion 32 is displaced. Second flange 48 is also provided with an aperture 49 within which securing lug 38 is displaced when the locking device is in the valve-closed position or valve-open position shown respectively in FIGS. 1 and 2. Lower surface 53 of second flange 48 engages under edge surfaces 37 of leg 35 when locking device 27 is in the valve-closed position or valve-open position.

Shroud base 44 is also provided with a first side member 54 which projects transversely to the longitudinal axis of shroud base 44 and extends downwardly from shroud base 44 to a position adjacent to L-shaped extension member 34 of handle assembly 28 and raised lug 36 when locking device 27 is in its operative position. Shroud base 44 is further provided with a second side flange 58 which extends from shroud base 44 in a direction opposite to that of first side member 54 and which also projects transversely to the longitudinal axis of shroud base 44 and extends downwardly from shroud base 44 to a position adjacent to L-shaped extension member 34.

Figure 3:
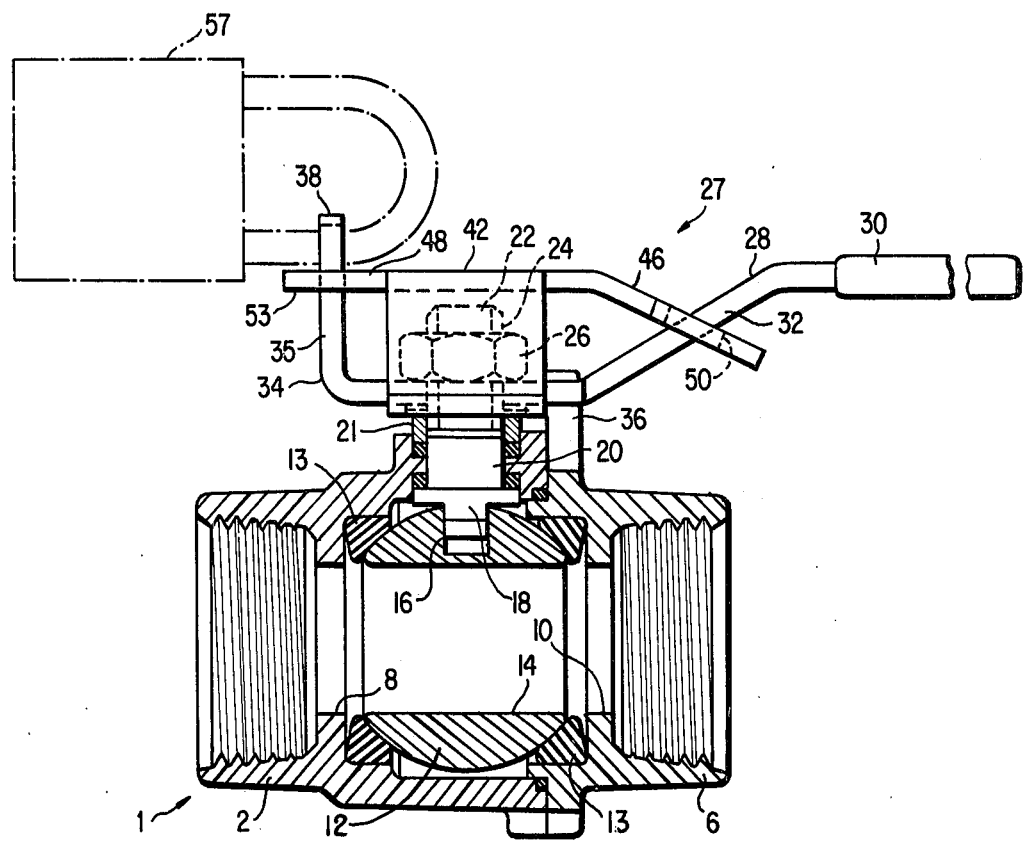
FIG. 3 is a partial cross-sectional view taken along lines III—III of FIG. 2.
Figure 4:
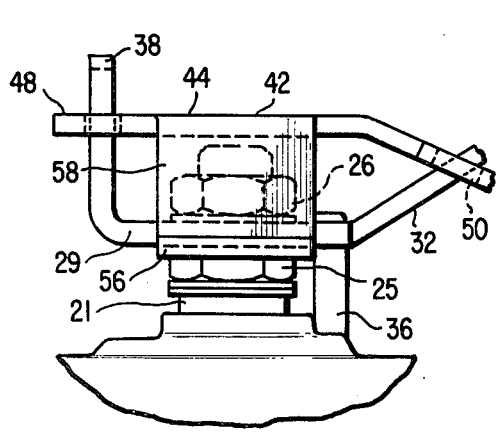
FIGS. 4 and 5 are different variations of the valve of the present invention with one or two stem nuts.

Stem nut 26 and associated washer 29 are substantially completely enclosed by intermediate handle portion 32, L-shaped extension member 34, shroud base 44, shroud base flanges 46 and 48 and side members 54 and 58. Thus, when locking device 27 is secured with a padlock 57 as shown in FIG. 3, movable locking shroud 42 is secured to handle assembly 28 and is prevented from being pivoted about intermediate handle portion 32 and tilted back from engagement with securing lug 38 to gain access to stem nut 26. In the event that it is not desired to padlock locking device 27, a similar type of locking member can be attached through lug aperture 40.

Figure 5:
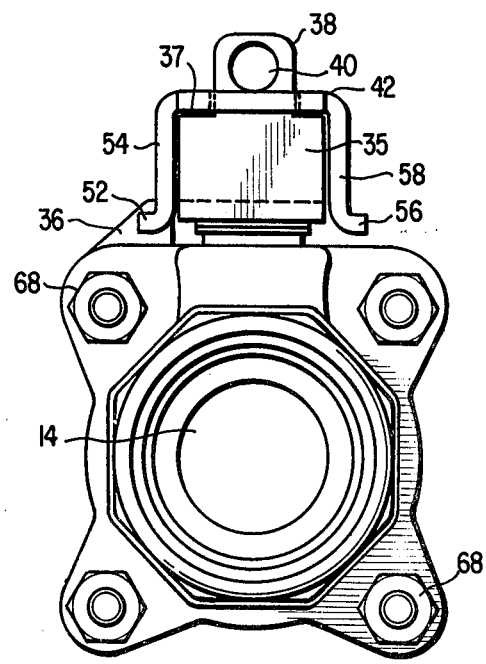

FIG. 5 best illustrates the valve-open locking operation of the present invention with respect to the abutting relationship of first side member 54 with raised lug 36. While first side member 54 is itself engageable with raised lug 36, a first side flange 52 may also be provided which extends in a plane perpendicular to that of first side member 54. Also, as shown in FIG. 1, rotation of handle assembly 28 in a counterclockwise direction, as indicated by the arrow, is necessary to change the valve position from a closed position to an open position. However, first side member 54 prevents rotation of locking device 27 in a counterclockwise direction by abuttingly engaging raised lug 36. Moreover, clockwise rotation is prevented when locking device 27 is in its locking position by abutting relationship between a portion of L-shaped extension member 34 and raised lug 36. Similarly, as shown in the valve-open position of FIG. 2, locking device 27 operatively secures valve 1 in an open position by abutting engagement of a portion of L-shaped extension member 34 and first side member 54 with raised lug 36 which effectively prevents rotation in either a clockwise or counterclockwise direction.

In operation, with locking device 27 initially in the valve-closed position of FIG. 1, first side member 54 and corresponding first side flange 52 abut one edge surface of raised lug 36 while a portion of L-shaped extension member 34 abuts an adjacent surface of raised lug 36. Simultaneously, movable locking shroud 42 via second flange 48 prevents counterclockwise rotational movement of securing lug 38, L-shaped extension member 34 and, in turn, valve 1. Similarly, application of a clockwise force to handgrip portion 30 of handle assembly 28 causes L-shaped extension member 34 to engagingly abut raised lug 36 of housing 2 to thereby prevent clockwise rotation of handle assembly 28. Therefore, when locking device 27 is positioned such that movable locking shroud 42 is interfittingly cooperating with handle assembly 28 and raised lug 36, valve 1 is locked into the valve-closed position as shown in FIG. 1. Moreover, in order to prevent an upward displacement of movable shroud 42, a padlock 57 or other conventional locking device can be secured through lug aperture 40 of securing lug 38.

Figure 2:
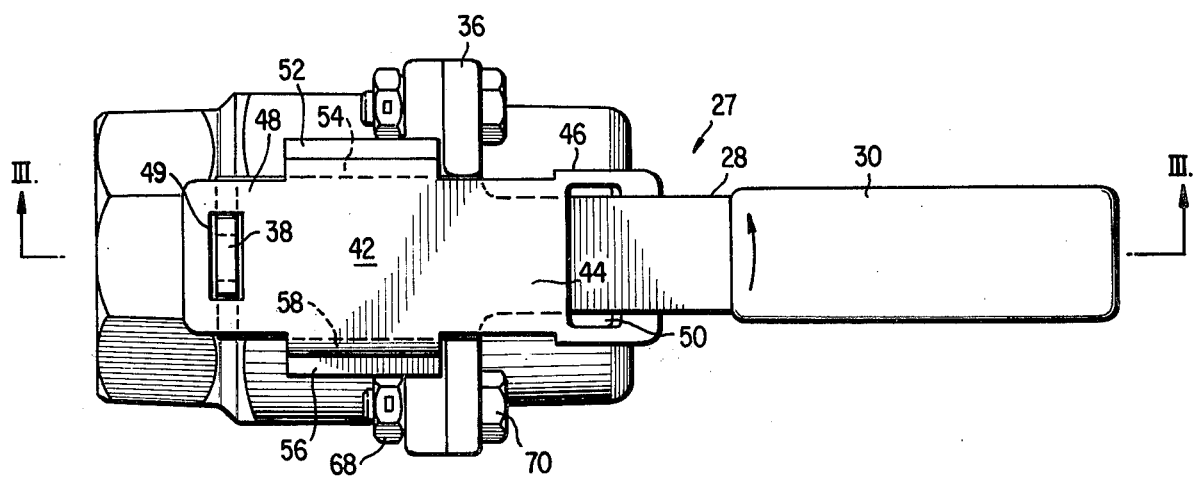
FIG. 2 is a plan view of the present invention in a valve-open position.

To allow for a change in valve position from that of the valve-closed position of FIG. 1 to the valve-open position of FIGS. 2 and 3, removal of padlock 57 or similar device is effected and movable locking shroud 42 is manually lifted at second flange 48 and pivoted upwardly about a transverse line along intermediate handle portion 32 while being supported by downwardly angled first flange 46 to thus allow locking shroud 42 to be slid along the longitudinal axis of handle assembly 28 towards handgrip portion 30. Once first side member 54 and first side flange 52 are disengaged from contact with raised lug 36 and are raised above the uppermost portion of raised lug 36, a counter-rotational force can be applied as indicated by the arrow in FIG. 1 to rotate handle assembly 28 simultaneously with movable locking shroud 42 as well as rotatable stem 20 to cause a rotation of rotatable ball 12 by 90° such that bore 14 thereof is aligned with ports 8 and 10 to allow for fluid flow therethrough as shown in FIG. 3.

To return movable shroud 42 to its original position, movable shroud 42 is slid along handle assembly 28 towards L-shaped extension member 34 and is simultaneously pivoted about a transverse line on intermediate handle portion 32 so as to align second flange aperture 49 with securing lug 38 such that second flange lower surface 53 subsequently engages with L-shaped extension member edge surfaces 37. Again, as shown in FIG. 3, movable locking shroud 42 serves to abuttingly engage raised lug 36 by contact with first side member 54 or first side flange 52 along one surface of raised lug 36 while an adjacent surface of raised lug 36 is engaged by an edge surface portion of L-shaped extension member 34 which is located adjacent to immediate handle portion 32. At this time, rotation in either a clockwise or counterclockwise direction is prevented upon application of a similar type of force to handgrip portion 30 of handle assembly 28 due to the interfitting cooperation of handle assembly 28, movable locking shroud 42 and raised lug 36. To further secure movable locking shroud 42 from being intentionally or unintentionally displaced in an upward direction, a padlock 57 or similar securing member can be attached to lug aperture 40.

As will become apparent from the foregoing description of the present apparatus a relatively simple and inexpensive locking device has been provided to lock and secure the handle of a valve having a rotatable stem. The locking device structure is simple in construction and is thus economical to manufacture and attach to valves, particularly in view of the fact the handle assembly 28 is of a one-piece or unitary construction. Moreover, locking device 27 serves to substantially completely enclose stem nut 26 so that it cannot be removed when locked. Furthermore, since movable locking shroud 42 is slidable over intermediate handle portion 32 of handle assembly 28, there is less likelihood of the same being misplaced or detached when the valve position is being changed.

Finally, movable shroud 42 and handle assembly 28, are symmetrical about line III—III as shown in FIG. 2 therefore, locking device 27 has no preferred orientation relative to stem 20, allowing side member 58 to act in the manner as side member 54. Also, handgrip 30 is attachable to rotatable stem 20 so as to lie at the opposite end of valve 1 as that shown in FIG. 2 and is therefore oriented 180° to handgrip 30 shown therein.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A locking device for a rotary valve having a stem assembly for rotation of said valve between an open or closed position, which comprises:

a handle assembly adapted to be connected to said stem assembly for rotation of said valve, and having a handgrip portion at a first end thereof and a securing member at a second end thereof;

locking means mounted on said handle assembly at a position spaced from said securing member so as to interfittingly cooperate with said handle assembly securing member and adapted to cooperate with an abutment means mounted on said housing to secure said valve handle in both the valve open position and the valve closed position.

2. The locking device of claim 1, wherein said locking means comprises a shroud member which includes a base, a first and second flange extending along the longitudinal axis of said base and a first side member projecting transversely to said longitudinal axis and downwardly from said base wherein a first edge of said side member engages said abutment means in said valve open position and a second edge of said side member engages said abutment means in said valve closed position.

3. The locking device of claim 2, wherein said shroud member further comprises a second side member projecting transversely and downwardly from said base on a portion thereof opposite to said first side member and wherein a nut, secured to said stem assembly, is disposed between said handle assembly and said shroud member such that said nut is substantially completely enclosed by said shroud member and said handle assembly.

4. The locking device of claim 1, wherein:
said abutment means comprises a raised lug.

5. The locking device of claim 1, wherein:
said locking means comprises a shroud member which includes a base, a first and second flange extending along the longitudinal axis of said base and a side member projecting transversely to said longitudinal axis and downwardly from said base wherein a first edge of said side member engages said abutment means in said valve open position and a second edge of said side member engages said abutment means in said valve closed position; and
said abutment means comprises a raised lug.

6. The locking device of claim 1, wherein:
said securing member further comprises an L-shaped handle assembly extension member including an upwardly projecting leg and a lug member connected to said projecting leg.

7. The locking device of claim 1, wherein:
said locking means comprises a shroud member which includes a base, a first and second flange extending along the longitudinal axis of said base and a side member projecting transversely to said longitudinal axis and downwardly from said base wherein a first edge of said side member engages said abutment means in said valve open position and a second edge of said side member engages said abutment means in said valve closed position; and
said securing member further comprises an L-shaped handle assembly extension member including an upwardly projecting leg and lug member connected to said projecting leg.

8. The locking device of claim 7, wherein:
said first flange includes an aperture and said second flange includes an aperture such that said handle assembly is interfittingly engaged with said first flange aperture at an intermediate portion of said handle assembly and said lug member is interfittingly engaged with said second flange aperture.

9. The locking device of claim 1, which further comprises:
means provided on said handle assembly for receiving and mounting a fastener to secure said locking means relative to said handle assembly and said abutment means.

* * * * *